US008473575B2

(12) United States Patent
Marchwicki et al.

(10) Patent No.: US 8,473,575 B2
(45) Date of Patent: Jun. 25, 2013

(54) METHODS AND APPARATUS FOR REMOTE ACTIVATION OF AN APPLICATION

(75) Inventors: Julius Marchwicki, Detroit, MI (US); Joseph N. Ross, Ypsilanti, MI (US); Mark Schunder, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 153 days.

(21) Appl. No.: 12/869,148

(22) Filed: Aug. 26, 2010

(65) Prior Publication Data

US 2012/0054300 A1 Mar. 1, 2012

(51) Int. Cl.
*G06F 15/16* (2006.01)
(52) U.S. Cl.
USPC .......................... 709/217; 709/203; 709/223
(58) Field of Classification Search
USPC ........................................ 709/203, 217, 223
See application file for complete search history.

(56) References Cited

U.S. PATENT DOCUMENTS

| | | | | |
|---|---|---|---|---|
| 2007/0042809 | A1* | 2/2007 | Angelhag | 455/569.1 |
| 2007/0294625 | A1* | 12/2007 | Rasin et al. | 715/748 |
| 2008/0220718 | A1* | 9/2008 | Sakamoto et al. | 455/41.2 |
| 2009/0228908 | A1* | 9/2009 | Margis et al. | 725/6 |
| 2009/0253466 | A1* | 10/2009 | Saito et al. | 455/569.2 |
| 2010/0063670 | A1* | 3/2010 | Brzezinski et al. | 709/248 |
| 2011/0105097 | A1* | 5/2011 | Tadayon et al. | 455/418 |

OTHER PUBLICATIONS

Ford Motor Company, "Navigation System: SYNC," Owner's Guide Supplement, Sync Version 1 (Jul. 2007).
Ford Motor Company, "SYNC," Owner's Guide Supplement, SYNC Version 1 (Nov. 2007).
Ford Motor Company, "Navigation System: SYNC," Owner's Guide Supplement, SYNC Version 2 (Oct. 2008).
Ford Motor Company, "SYNC," Owner's Guide Supplement, SYNC Version 2 (Oct. 2008).
Ford Motor Company, "Navigation System: SYNC," Owner's Guide Supplement, SYNC Version 3 (Jul. 2009).
Ford Motor Company, "SYNC," Owner's Guide Supplement, SYNC Version 3 (Aug. 2009).
Kermit Whitfield, "A hitchhiker's guide to the telematics ecosystem", Automotive Design & Production, Oct. 2003, http://findarticles.com, pp. 1-3.
SDP Layer Tutorial, Palowireless, Bluetooth Resource Center, http://www.palowireless.com/infotooth/tutorial/sdp.asp, Aug. 3, 2010.

* cited by examiner

*Primary Examiner* — Phuoc Nguyen
(74) *Attorney, Agent, or Firm* — Jennifer M. Stec; Brooks Kushman P.C.

(57) ABSTRACT

An application activation method includes interfacing a vehicle computing system with a remote device using an interface protocol. The method also includes sending a query from the vehicle computing system to the remote device to determine applications and/or services available on the remote device that are capable of interaction with the vehicle computing system. Once the applications have been determined, the method includes selecting, at the vehicle computing system, an application or service from the determined available applications and/or services for interaction. The method also includes sending an instruction from the vehicle computing system to an agent on the remote device, the instruction including an indication that the selected application or service is to be activated. Finally, the method includes receiving confirmation, at the vehicle computing system, that the application or service has been activated.

20 Claims, 5 Drawing Sheets

METHODS AND APPARATUS FOR REMOTE ACTIVATION OF AN APPLICATION

BACKGROUND

1. Technical Field

The illustrative embodiments generally relate to methods and apparatus for remote activation of an application.

2. Background Art

Modern vehicle communication and/or computing systems are becoming increasingly capable of interaction with remote (i.e., not part of the vehicle computing system) devices. These devices range from, but are not limited to, cellular phones, pdas, GPS devices, remote servers, wireless routers, smartphones, medical devices, personal health and wellness devices, tablet PCs, laptops, etc.

In some instances, such as with the FORD SYNC system, a remote device may be used as an intermediary means of communication to send a signal to a remote network. Although the remote (or nomadic) device is used to send this signal, it may also be capable of further interaction with the vehicle computing system.

Through the use of application programming interfaces (APIs), applications running on the nomadic device can interface with the vehicle computing system. For example, a program that selectively plays digital music on the nomadic device can be used to play music through the vehicle speaker system using an interface with the vehicle computing system.

Of course, when a person is driving a vehicle, it is safer to have as much of the driver interaction with devices be as hands-free as possible. Accordingly, the driver is able to interact with the vehicle computing system through the use of a microphone and voice-commands. This prevents, to a large extent, the driver from having to take focus from the road to activate a desired feature.

Similarly, interaction with the nomadic device may or may not be hands-free. Of course, if the driver is speaking commands to a plurality of devices, the devices themselves may be confused, not knowing which device the driver is addressing. Further, although there may be a particular nomadic device application the driver wishes to have interact with the vehicle, the application may not be able to interact with the vehicle until the driver actually activates the application on the nomadic device.

On certain nomadic devices, applications are running in a background layer constantly (at least in part), whereas in other devices, the applications may need to be activated. If there is no option to activate an application hands-free on the device, the driver may need to take focus from the road and manually access the desired application to activate it for interaction with the vehicle computing system.

SUMMARY

In a first illustrative embodiment, an application activation method includes interfacing a vehicle computing system with a remote device using an interface protocol.

The method also includes sending a query from the vehicle computing system to the remote device to determine applications and/or services available on the remote device that are capable of interaction with the vehicle computing system.

Once the applications have been determined, the method includes selecting, at the vehicle computing system, an application or service from the determined available applications and/or services for interaction. The method also includes sending an instruction from the vehicle computing system to an agent on the remote device, the instruction including an indication that the selected application or service is to be activated.

Finally, the method includes receiving confirmation, at the vehicle computing system, that the application or service has been activated.

In a second illustrative embodiment, a computer readable storage medium (such as, but not limited to, a hard drive, RAM, ROM, DVD, CD, disk, flash memory, etc.) stores instructions for an application activation method. When the instructions are processed, a vehicle computing system is caused to perform the steps including sending a query from the vehicle computing system to a remote device to determine applications and/or services available on the remote device that are capable of interaction with the vehicle computing system.

The system is also caused to select an application or service from the determined available applications and/or services for interaction. The system is further caused to send an instruction from the vehicle computing system to an agent on the remote device, the instruction including an indication that the selected application or service is to be activated.

Finally, the system is caused to receive confirmation that the application or service has been activated.

In a third illustrative embodiment, an application activation method includes receiving, at a vehicle computing system, a list of applications available on a remote device for interaction with the vehicle computing system.

The method further includes determining that one of the applications is desired for activation. The method also includes sending, from the vehicle computing system, an instruction to an agent running on the remote device indicating that the one of the applications should be activated.

Finally, the method includes receiving, at the vehicle computing system, confirmation that the one of the applications has been activated.

DETAILED DESCRIPTION

Figure 1:
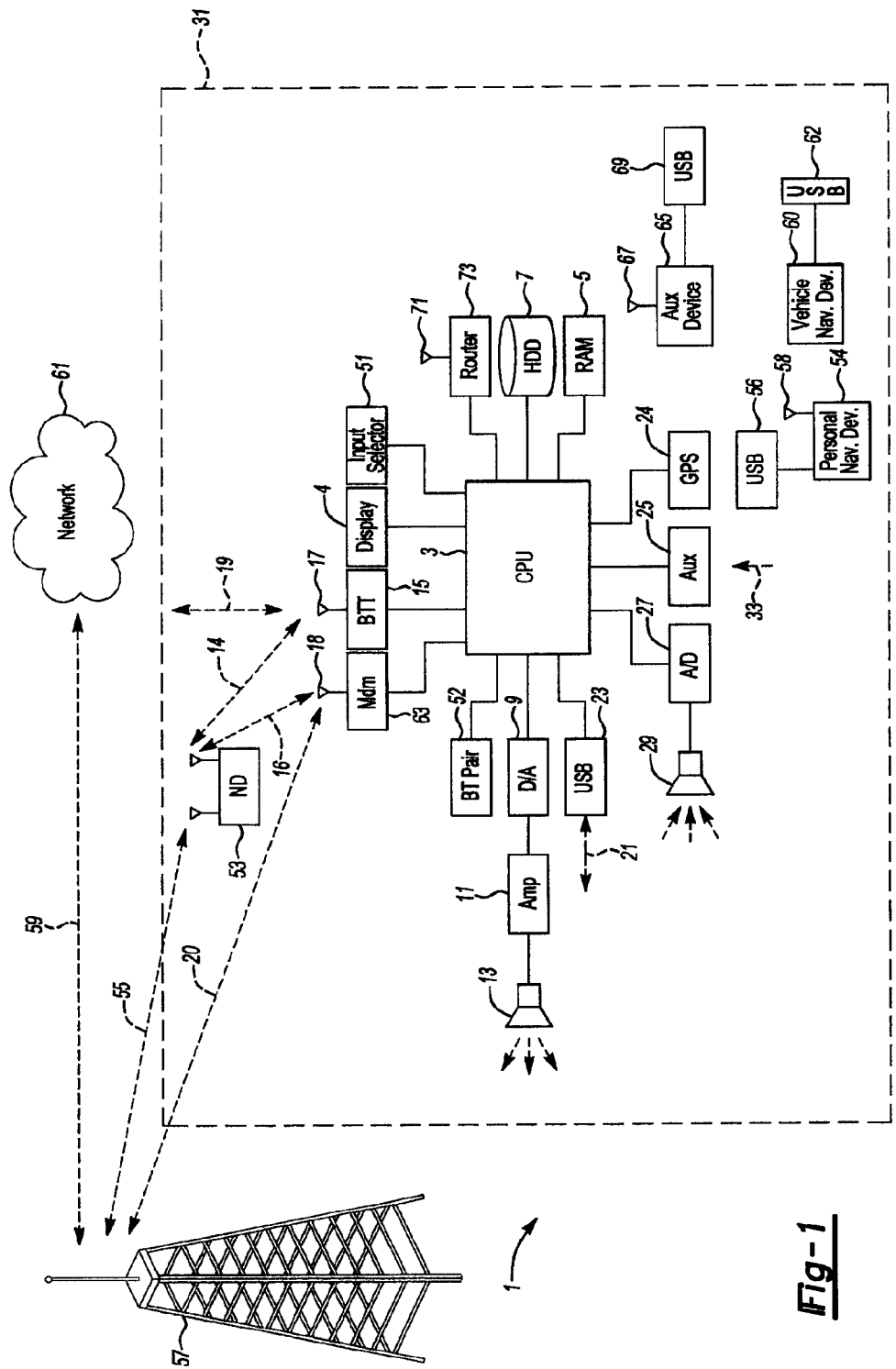
FIG. 1 shows an exemplary configuration for an illustrative vehicle computing system usable with the illustrative embodiments.

FIG. 1 illustrates an example block topology for a vehicle based computing system 1 for a vehicle 31. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor.

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, etc.). The nomadic device can then be used to communicate 59 with a network 61 outside the vehicle 31 through, for example, communication 55 with a cellular tower (or satellite) 57. In some embodiments, tower 57 may be a WiFi access point.

Exemplary communication between the nomadic device and the BLUETOOTH Transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device).

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example).

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58; or a vehicle navigation device 60, having a USB 62 or other connection, an onboard GPS device 24, or remote navigation system (not shown) having connectivity to network 61.

Further, the CPU could be in communication with a variety of other auxiliary devices 65. These devices can be connected through a wireless 67 or wired 69 connection. Also, or alternatively, the CPU could be connected to a vehicle based wireless router 73, using for example a WiFi 71 transceiver. This could allow the CPU to connect to remote networks in range of the local router 73.

With certain nomadic devices, applications already existent may not be able to interact with a vehicle computing system unless those applications are already running. Since it may be dangerous and/or inconvenient for a driver to take focus from the road to activate an application, the illustrative embodiments provide a means to activate an application using the vehicle computing system and/or verbal driver-provided commands, so that the driver's focus can remain on driving.

Figure 2:
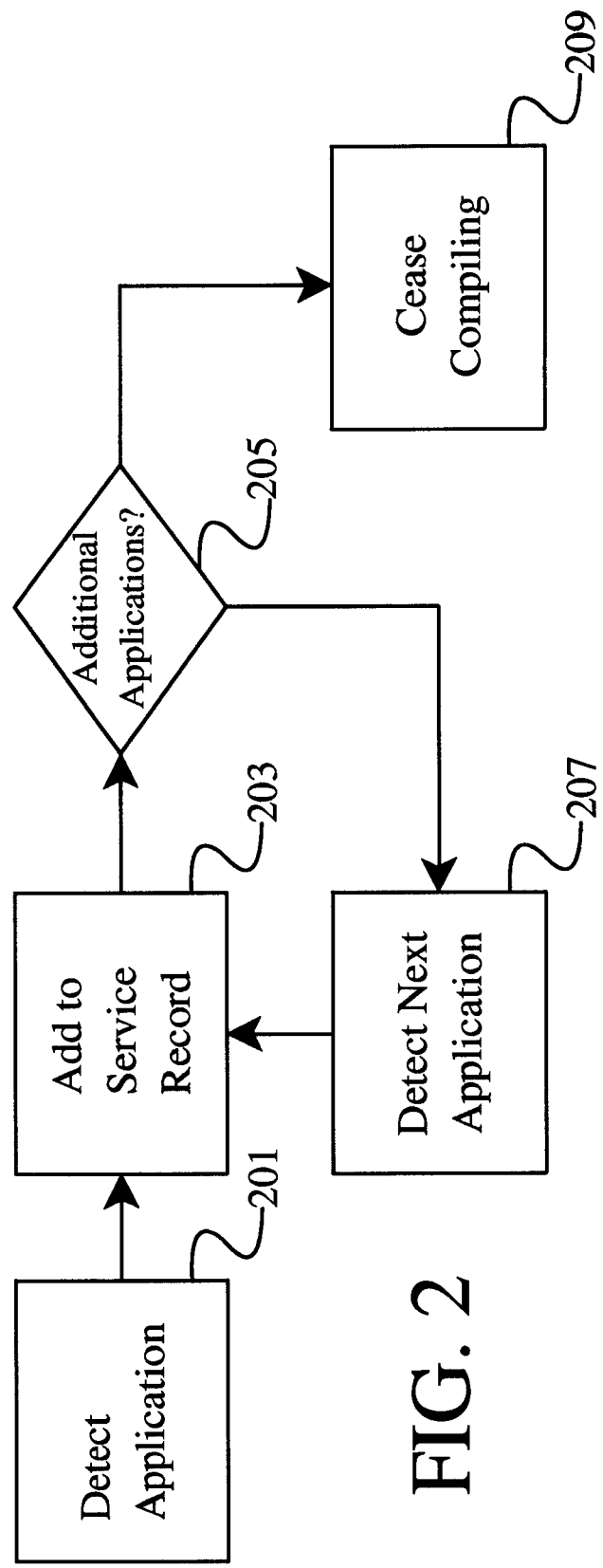
FIG. 2 shows an exemplary process for compiling a list of applications available on a nomadic device.

In a first illustrative embodiment shown in FIG. 2, the vehicle computing system is made aware of the applications available on a nomadic device that may be interfaceable with the computing system. In this embodiment, this is done through the use of BLUETOOTH service discovery protocol (SDP) records. Other records and/or indexes that provide similar information can also be used in conjunction with further illustrative embodiments.

In this embodiment, applications are loaded on to a nomadic device by a user. When the application is added to the device, the application may be detected 201 and added to a list of available applications as a service record 203.

In this embodiment, the service record contains a list of attributes associated with that service. Additional services may be added 207 to the record, or, if no more applications exist 205, the index may cease compiling 209.

Figure 3:
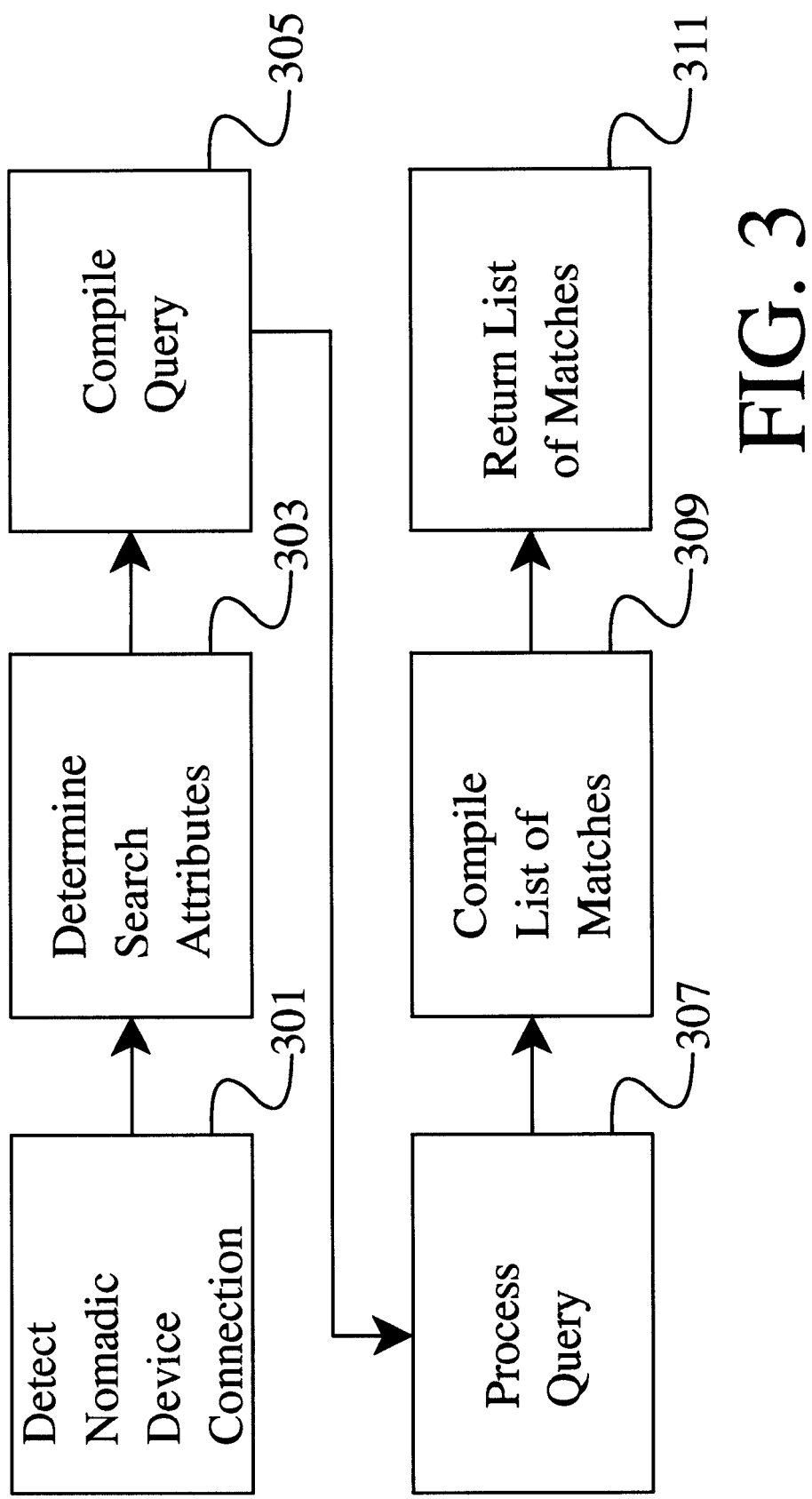
FIG. 3 shows an illustrative example of a process for searching a list of applications on a nomadic device from a remote device.

Once a list of available services is indexed, this list may be searchable by a remote device using BLUETOOTH protocols. One illustrative example of this is shown in FIG. 3.

In this illustrative embodiment, the vehicle computing system first detects a connection to a nomadic device 301. Once the connection has been established, the vehicle computing system determines one or more attributes on which it would like to search 303. For example, in this embodiment, the system is searching for service records that have an attribute indicating compatibility with the particular vehicle computing system.

Queries could also be for other attributes of applications in the service records. Queries can further be for more than one attribute, for example, a query for compatible programs that also play music could be launched. Any attribute or combination of attributes recorded in the service record can be searched by the query.

A query may be compiled by the vehicle computing system 305 and is sent to the nomadic device 307. Alternatively, if the nomadic device is capable of compiling the query, the desired attribute(s) may be sent to the device for compilation. In either event, the query is designed to return information about the services available on the nomadic device that are compatible with the vehicle computing system.

In yet another embodiment, a copy of the service record could be sent to the vehicle computing system for local querying. In this instance, a copy of the service record could even be saved locally, so that when the vehicle computing system is in communication with a particular nomadic device, it already has a record of what programs exist on that device. In this instance, it may be desirable to assign or have a version attribute associated with the service record, so the vehicle computing system can quickly check to see if a new version exists on the nomadic device.

The query is run using the service record and a list of matching service records is compiled 309. This list of service records (or a corresponding set of information) may be returned to the vehicle computing system 311 so the system knows which applications are available on the nomadic device for interface. At this point, the vehicle computing system presumably has a list of available services on the nomadic device.

Figure 4:
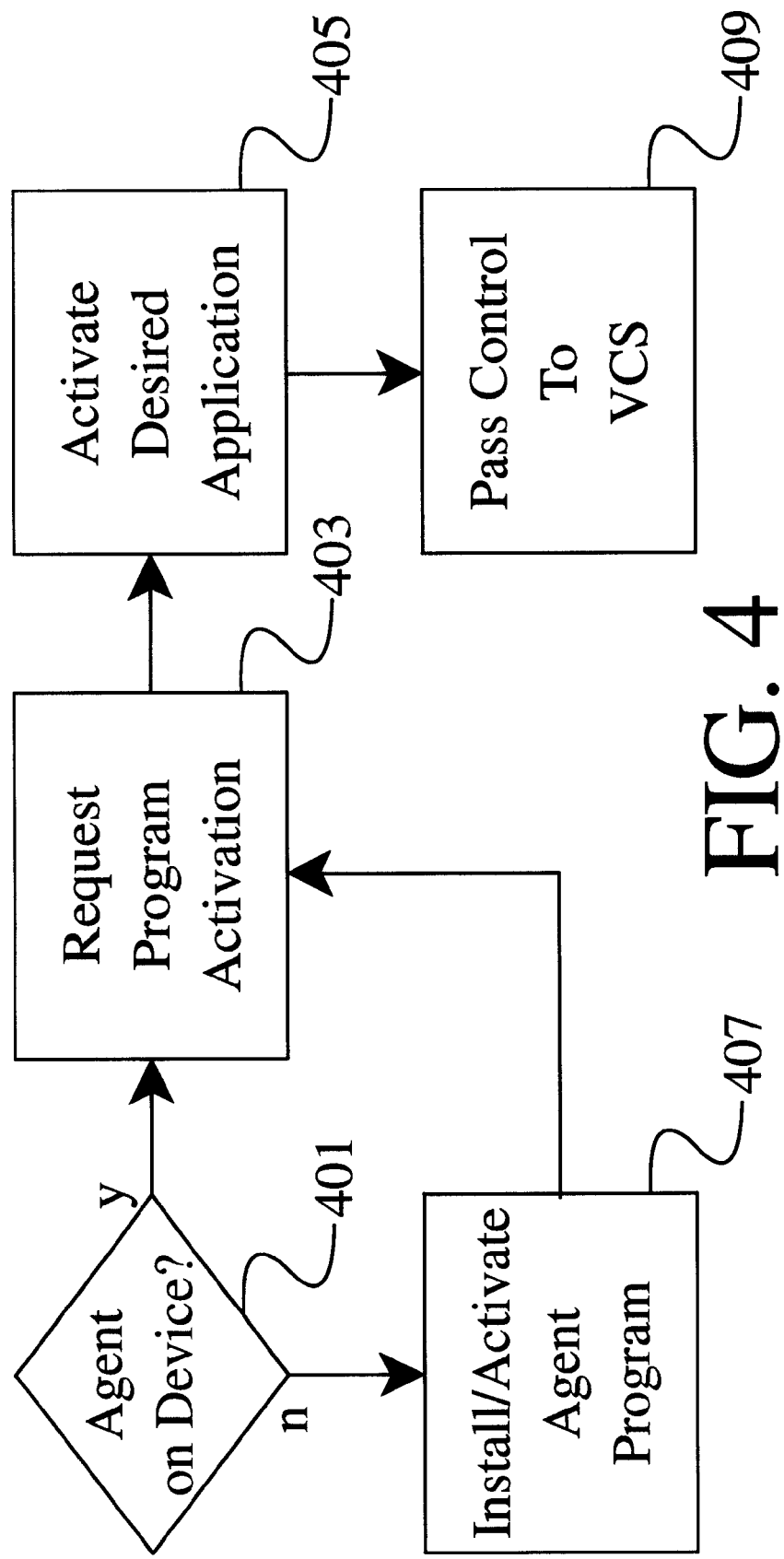
FIG. 4 shows an exemplary process for detecting/installing an agent.

In a further illustrative embodiment, the nomadic device is of the sort where an application must be launched before interaction with the vehicle computing system is possible. An example of this interaction is shown in FIG. 4. In this illustrative embodiment, the vehicle computing system is able to remotely instruct the activation of a desired service, so that the user does not have to manually interact with the nomadic device in order to launch the desired application.

In this embodiment, the vehicle computing system checks to see if an agent exists on the nomadic device 401. The agent, in this illustrative case, is a program that is capable of instructing the activation of a further application on the nomadic device. The agent can be permanently installed on the nomadic device, or it can be loaded/activated by the vehicle computing system any time interaction with the nomadic device is desired (or each time communication is synched between the system and the device, etc.).

If the agent is not present 401, the vehicle computing system will load the agent onto the nomadic device 403 (similar checks and steps can be taken for detecting, for example, if the agent is active and/or for activation of a present-but-not-active agent).

Once the agent is present/active, the vehicle computing system may send a request for activation of a particular application 405. In this case, the request is an activation request, although in other instances the vehicle computing system may send a request for interaction with a particular service.

When the agent receives the request from the vehicle computing system, it is capable of determining which application on the remote device is to be activated 407. Then, using native device procedures, the agent is capable of activating the desired application 409 for interaction with the pending request (or in response to an activation request). Once the application is running on the nomadic device, the interaction between the vehicle computing system and the nomadic device application can then proceed in an intended fashion.

In this illustrative embodiment, control is passed to the vehicle computing system once the application is activated 411. In another example, however, the vehicle computing system could continue to pass messages through the agent program.

Figure 5:
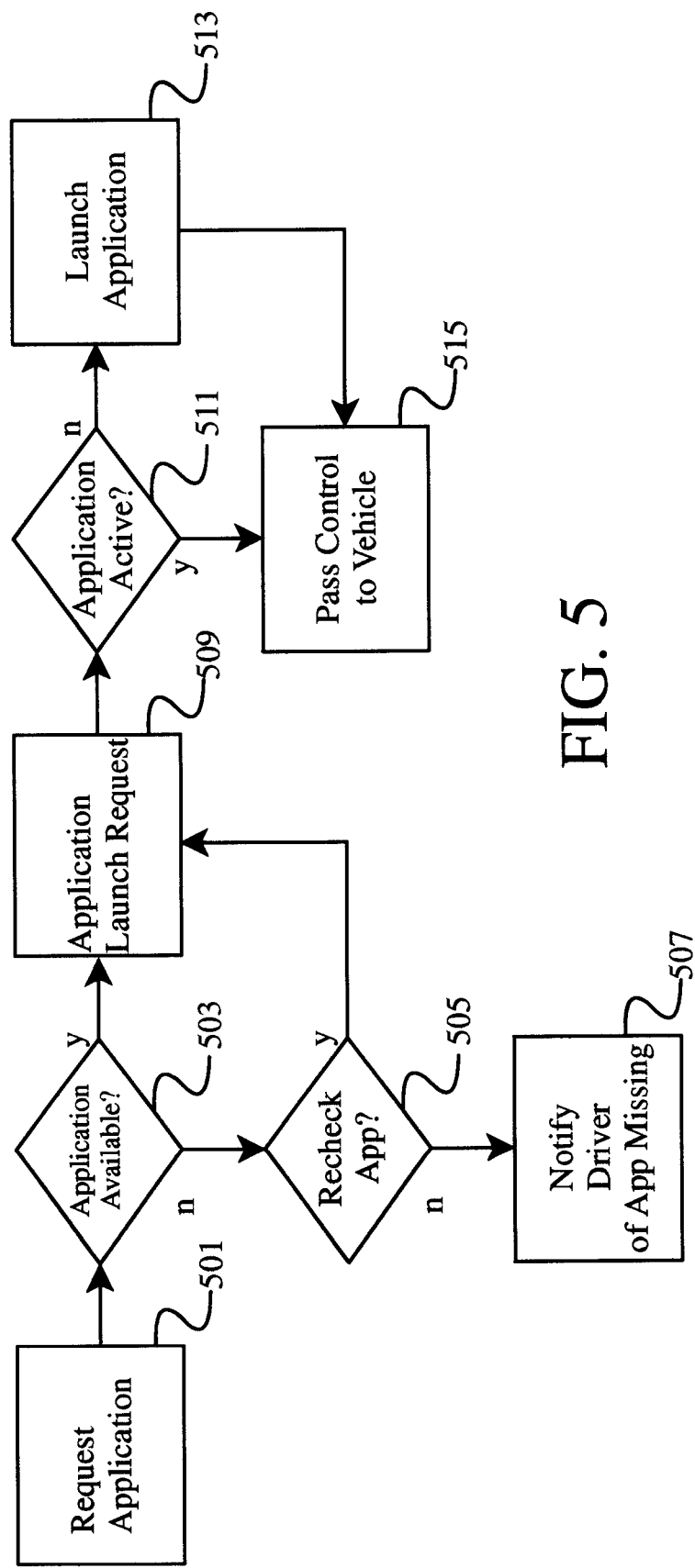
FIG. 5 shows an exemplary process for application activation.

Using such a system, this entire indexing/startup procedure can remain completely transparent to a driver. FIG. 5 shows an illustrative example of driver interaction with a vehicle computing system in a transparent manner. In this example, all the driver knows of the interaction is that the requested feature is performing the requested service.

In this illustrative example, the driver submits a request to the vehicle computing system 501. In this case, it is a verbal request for a music service, called PANDORA. Of course, this is just one illustrative example showing the possibilities for application across a variety of services.

The actual service requested, in this case, PANDORA, is installed on a nomadic device in communication with the vehicle computing system, not on the system itself. Accordingly, the vehicle computing system may desire to run the application from the nomadic device. Such an act would be possible if either the application was already running or if the vehicle computing system had a means of making the application begin. Of course, the user could also activate the application manually, but this may create a hazardous driving condition and is preferred to be avoided if possible.

Once the system receives the driver request for the service 501, the system checks its internal logs (created, in this instance, when the nomadic device first interfaced with the vehicle computing system) to see if PANDORA is an available service. In other non-limiting instances, the first time a remote service is requested, the indexing could be performed.

If PANDORA is available 503, the system proceeds with activation, but if PANDORA is not available, the system may recheck the service record 505. If the service record is checked and it is confirmed that the application is not available, the driver may be notified 507 and the attempt to activate the service will cease.

If PANDORA is available, the vehicle computing system sends the appropriate command to the agent on the nomadic device 509. The agent receives the command, and, if PANDORA is not already activated 511, activates PANDORA 513. The vehicle computing system may be notified of the activation, and then interaction between the vehicle computing system and PANDORA can continue as desired 515.

In still another illustrative embodiment, the vehicle computing system may compile a list of compatible applications on the nomadic device and read/display that list to the user.

For example, when the nomadic device app provides a list of applications to the vehicle computing system via BT or other wireless communication, the system then can determine which of those applications are compatible with the vehicle computing system (assuming the app providing the applications has not already determined this). The vehicle computing system could then output the list of available applications so the user knows what applications are currently available.

In still a further embodiment, processes running within the vehicle computing system may trigger certain applications dynamically, based, for example, on the user's environment. For example, the applications could have certain triggers associated therewith. When one of these triggers was met, the vehicle computing system could activate the application or prompt activation of the application. In one example, if the user is low on gasoline and a gas station is nearby, an application to output the local price, average price, etc. of gasoline could be activated.

In yet a further embodiment, the vehicle computing system is operable to exchange data with the nomadic device to assist the application running on the nomadic device in determining which applications can run on this particular vehicle computing system.

For example, if an application requires a 4" navigation display, and the vehicle is not equipped with such a display, the remote activation application may not list this application as an available application for that session.

If communication is interrupted (for example, if the battery on the nomadic device dies and the driver has to plug the nomadic device into a power source and reactivate the device), this communication procedure can be used to restore the previous connection. In at least one illustrative embodiment, the vehicle computing system can store a record of the unexpected interruption, and can automatically restore the service and communication once the device is again powered-up and available for interaction.

What is claimed:

1. An application activation method comprising:
   interfacing a vehicle computing system with a remote device using an interface protocol;
   sending a query from the vehicle computing system to the remote device to determine applications available on the remote device that are capable of interaction with the vehicle computing system;
   selecting, at the vehicle computing system, an application from the determined available applications for interaction;
   sending an instruction from the vehicle computing system to an agent application on the remote device, including an indication that the selected application is to be activated; and
   receiving confirmation, at the vehicle computing system, that the application has been activated.

2. The method of claim 1, wherein the interface protocol is a wireless protocol.

3. The method of claim 2, wherein the wireless protocol is a BLUETOOTH protocol.

4. The method of claim 1, wherein the query is performed using the SDP BLUETOOTH protocol.

5. The method of claim 1, wherein the instruction is directed at the selected application, and wherein the agent application activates the selected application based on a detection that an instruction to the selected application has been sent by the vehicle computing system.

6. The method of claim 1, wherein the instruction is an instruction directed at the agent application to activate the selected application.

7. The method of claim 1, wherein the query is performed using a custom protocol.

8. The method of claim 1, wherein the confirmation is established by a response to the instruction sent from the selected application to the vehicle computing system.

9. A tangible computer readable storage medium storing instructions for an application activation method, such that when the instructions are processed, a vehicle computing system is caused to perform the steps comprising:

sending a query from the vehicle computing system to a remote device to determine applications available on the remote device that are capable of interaction with the vehicle computing system;
   selecting, at the vehicle computing system, an application from the determined available applications for interaction;
   sending an instruction from the vehicle computing system to an agent application on the remote device, the instruction including an indication that the selected application is to be activated; and
   receiving confirmation, at the vehicle computing system, that the application has been activated.

10. The computer readable storage medium of claim 9, wherein the interface protocol is a wireless protocol.

11. The computer readable storage medium of claim 10, wherein the wireless protocol is a BLUETOOTH protocol.

12. The computer readable storage medium of claim 9, wherein the query is performed using the SDP BLUETOOTH protocol.

13. The computer readable storage medium of claim 9, wherein the instruction is directed at the selected application, and wherein the agent application activates the selected application based on a detection that an instruction to the selected application has been sent by the vehicle computing system.

14. The computer readable storage medium of claim 9, wherein the instruction is an instruction directed at the agent application to activate the selected application.

15. The computer readable storage medium of claim 9, wherein the confirmation is sent from the agent application to the vehicle computing system.

16. The computer readable storage medium of claim 9, wherein the confirmation is established by a response to the instruction sent from the selected application to the vehicle computing system.

17. A method comprising:
    receiving, at a vehicle computing system (VCS), a list of applications available on a remote device for interaction with the VCS;
    determining that one of the applications is desired for activation;
    sending, from the VCS, an instruction to an agent application running on the remote device indicating that the one of the applications should be activated; and
    receiving, at the VCS, confirmation that the one of the applications has been activated.

18. The method of claim 17, wherein communication between the VCS and the remote device is done using a wireless protocol.

19. The method of claim 18, wherein the wireless protocol is a BLUETOOTH protocol.

20. The method of claim 17, further comprising:
    querying, from the vehicle computing system, the remote device for the list of applications available on the remote device for interaction with the vehicle computing system.

* * * * *